United States Patent [19]

Cormier

[11] 3,898,623

[45] Aug. 5, 1975

[54] SUSPENSION AND RESTART OF INPUT/OUTPUT OPERATIONS

[75] Inventor: Roger L. Cormier, Pleasant Valley, N.Y.

[73] Assignee: International Business Machines Corporation, Armonk, N.Y.

[22] Filed: June 5, 1973

[21] Appl. No.: 367,281

[52] U.S. Cl. .......... 340/172.5
[51] Int. Cl. ...... G06f 3/00; G06f 9/18; G06h 13/00
[58] Field of Search .......... 340/172.5

[56] References Cited

UNITED STATES PATENTS

| | | | |
|---|---|---|---|
| 3,303,476 | 9/1967 | Moyer et al. | 340/172.5 |
| 3,336,582 | 8/1967 | Beausoleil et al. | 340/172.5 |
| 3,488,633 | 1/1970 | King et al. | 340/172.5 |

*Primary Examiner*—Raulfe B. Zache
*Assistant Examiner*—Jan E. Rhoads
*Attorney, Agent, or Firm*—Robert Lieber

[57] ABSTRACT

An input/output subsystem in which a peripheral device controller controls the device in response to commands received from an input/output (I/O) channel which is connected to a processor. A channel address word (CAW) and a sequence of channel command words (CCW's) are fetched from a main memory and executed by the I/O channel. If a delay condition such as a paging fault in a virtual memory occurs, the channel signals the device controller over an interface. In response to the signal, the device controller turns on a suspend latch and sets zero status which is returned to the I/O channel. After the paging fault or the delay condition has been corrected by the processor, the channel operation is continued by issuing a restart I/O instruction. In executing the restart I/O instruction, the channel turns on a restart latch and validates the previous CCW and CAW fetches. The channel program starts at the point where a command is gated to the device and since the restart latch is on, a command of zero is gated. A command of zero received at the I/O controller plus the condition that the suspend latch is on, causes the controller to resume the suspended operation at the point where it was discontinued. Since the previous CCW and CAW fetch have been validated, the control unit operation reenters the channel program at the point of suspension.

7 Claims, 20 Drawing Figures

(KING ET AL 3,488,633)

CONTROL UNIT OPERATION

PRIOR ART
BEAUSOLEIL ET AL 3,336,582

(KING ET AL FIG. 16)

(KING ET AL FIG. 16A)

(KING ET AL FIG.16B)

(KING ET AL FIG. 16F)

(KING ET AL FIG. 16G)

PATENTED AUG 5 1975 3,898,623

SHEET 12

(KING ET AL FIG. 16S)

CHANGES TO PRIOR ART (BEAUSOLEIL ET AL (BEAUSOLEIL ET AL FIG. 4E)

(BEAUSOLEIL ET AL FIG. 4G)

(BEAUSOLEIL ET AL FIG.4I)

PRIOR ART (BEAUSOLEIL ET AL FIG.4H)

SUSPENSION AND RESTART OF INPUT/OUTPUT OPERATIONS

FIELD OF THE INVENTION

This invention relates to apparatus for executing a series of control words comprising an input/output program and to a control unit for receiving and executing commands generated by said apparatus; and more particularly to means for suspending the operation of said control unit during execution of particular command and means in said I/O controlling apparatus for restarting said suspended operation.

DESCRIPTION OF THE PRIOR ART

Input/output devices provide for the communication of data to a data processing system or between data processing systems. Devices are controlled by a control unit which provides the logic necessary to operate and control the I/O device. The control unit responds to commands received from a data channel which controls the flow of information between the I/O devices and the main storage of the data processing system. The channel, in response to an instruction in the main program of the data processing system, fetches and executes a channel program independently of the central processing unit (CPU). The channel program is made up of instructions called channel command words (CCW's). CCW's related to each other are chained together to perform operations with respect to a single control unit in a predetermined sequence. A CCW specifies the command to be executed, the storage area to or from which the data are to be transferred, and a count indicating the number of bytes of information to be transferred.

On IBM System/360 and System/370 channels, once an I/O operation is initiated by the channel it is executed at a rate determined by the I/O devices. If one device requests a data transfer sequence and the channel is not capable of transferring this data for some period of time, the channel must either stop the device causing a complete restart at a later time, or hold the device actively connected to the channel for this period of time, thus preventing the channel from being used by other devices.

Furthermore, in a virtual memory system where memory space is allocated by means of pages which are swapped back and forth between memory units in the hierarchy of the memory, it is necessary to have a means for suspending an I/O operation for a long period of time while pages are moved. That is, an I/O operation encountering a page fault must be temporarily suspended until the page is refreshed and the operation continued from the point of suspension without a complete restart of the channel program.

SUMMARY OF THE INVENTION

It is an object of the present invention to provide a means for suspending a channel program and for reentering the channel program at the point of suspension.

It is a further object of the present invention to provide an improved I/O control apparatus for controlling peripheral devices which includes means for restarting and thereby continuing the execution of a suspended channel program.

It is also an object of the invention to provide an improved peripheral control apparatus which includes means for suspending the operation of an I/O device upon signalling from an I/O control apparatus for later resuming said operation.

Briefly, the above objects are accomplished in accordance with the invention by providing means at a controlling apparatus, such as a data channel, for signalling an attached control unit when the channel detects that it cannot continue an operation for some period of time. In response to this signalled suspend indication, the control unit sends a status byte of zero to the channel which indicates to the channel that the control unit is capable of suspending the operation. The channel retains the necessary parameters in a subchannel or in its registers for the continuation of the I/O operations after the period of time has elapsed. When the operation can be continued, the central processing unit issues a restart instruction to the channel which causes the channel to select the device and issue a command of zero to the device. The device responds with a zero status byte and the operation is continued from the point of suspension.

The invention has the advantage of providing means for stopping an I/O operation temporarily and continuing the operation at a later time without the necessity of re-executing the entire channel program.

The invention has the further advantage that I/O devices not equipped with means for suspending an operation are able to recognize the suspend operation as a normal stop sequence and therefore are fully compatible with devices equipped with the suspend feature.

These and other objects, advantages and features of the present invention will become more readily apparent from the following specification when taken in conjunction with the drawings.

BRIEF DESCRIPTION OF THE DRAWINGS

FIG. 1 is a block schematic diagram of a typical control unit in which the invention is embodied;

GENERAL DESCRIPTION

Figure 4:
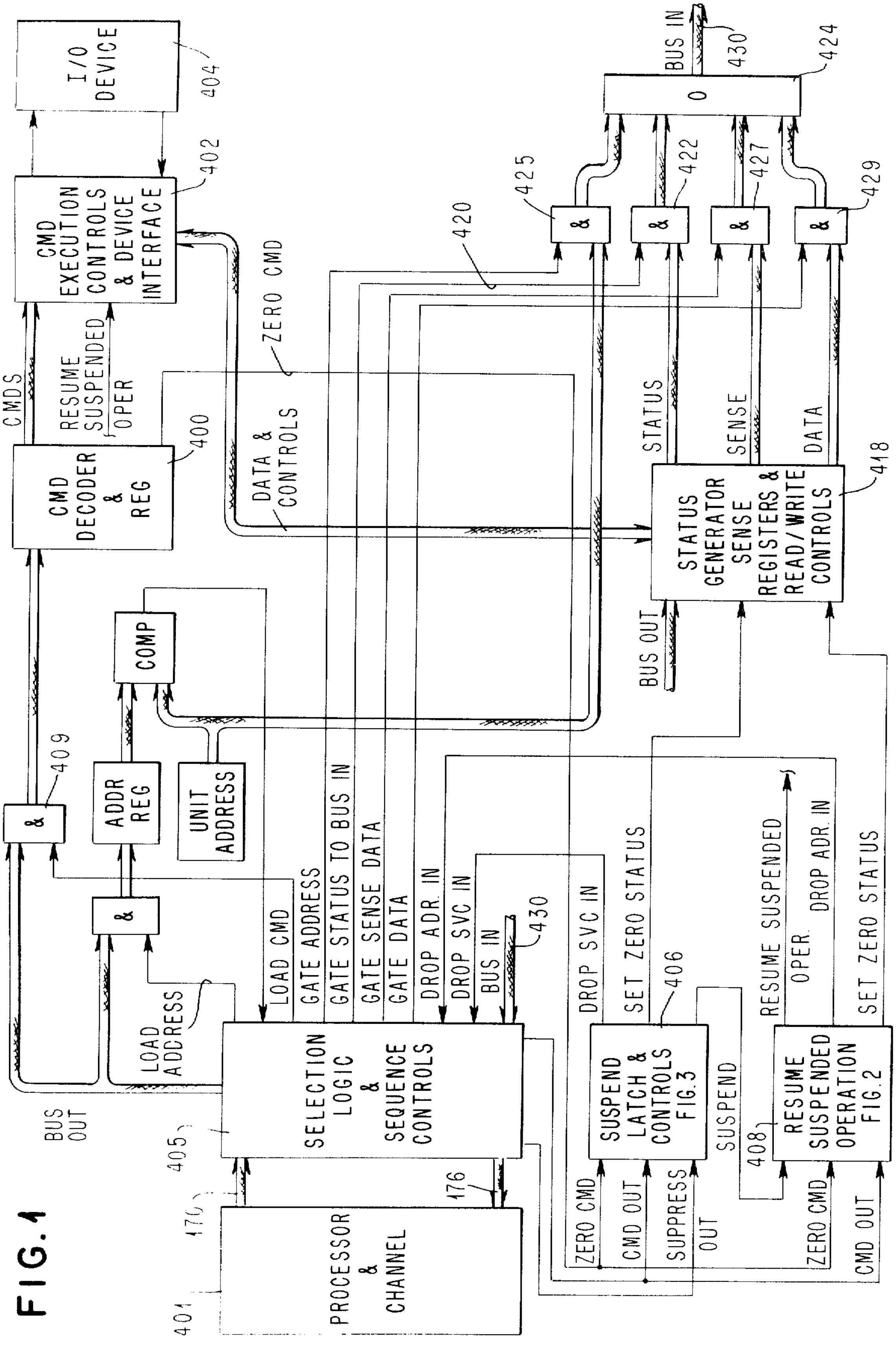
FIG. 4 is a flow diagram illustrating a channel operation utilizing the present invention.

The present invention is described with respect to a data processing system which operates in accordance with the description found in IBM System/360 Principles of Operation, IBM System Reference Library, Form No. A22-6821-5 which can be obtained by contacting IBM Branch Office.

In U.S. Pat. No. 3,488,633 — Automatic Channel Apparatus — filed Apr. 6, 1964 and issued Jan. 6, 1970 to L. E. King et al. and assigned to the assignee of the present application, there is disclosed a channel apparatus which disclosure is incorporated herein by reference. FIGS. 6 – 12; and 13, 14 are similar to FIGS. 16, 16A, 16B, 16C, 16D, 16F, 16G; and 16S of the King et al. application with additions in accordance with the present invention illustrated by dotted lines on the appropriate drawings.

In U.S. Pat. No. 3,336,582 – Interlocked Communication System – filed Sept. 1, 1964 and issued Aug. 15, 1967 to W. F. Beausoleil et al. and assigned to the assignee of the present application, there is disclosed a communication system for communicating between a channel and a control unit of the type described in FIG. 1 of this application, which disclosure is incorporated herein by reference. FIGS. 15 – 20 of the present application correspond to FIGS. 4C, 4E, 4G, 4I, 4H and 4J, respectively, of the Beausoleil et al. patent with additions in accordance with the present invention illustrated by dotted lines.

A typical control unit for use with and incorporating the present invention is shown in FIG. 1. This control unit is adapted to operate with the input/output interface described in the above identified Beausoleil et al. patent. A complete description of a typical control unit adapted to operate with such an interface is found in U.S. Pat. No. 3,303,476 — Input/Output Control — J. T. Moyer et al., filed Apr. 6, 1964 and issued Sept. 7, 1967 and assigned to the assignee of the present invention.

Referring to FIG. 1, a processor and channel 401 is attached to a control unit by means of an I/O interface 170, 176. Two interface lines are controlled at the control unit by selection logic and sequence controls 405 which contain the logic for communicating with the processor and channel in accordance with logic described in the above identified Beausoleil et al. U.S. Pat. No. 3,336,582. The bus out from the interface is connected to an AND circuit 409 which allows the interface controls to load a command into a command decoder and register 400. This logic decodes the command and sends the command to command execution controls and device interface 402. These controls 402 are connected to an I/O device 404. The command is executed and data transfer occurs over a bus to logic block 418 and is gated via AND 429 to Bus In. As the count portion of the channel command word (CCW) is exhausted, new CCW's are fetched in accordance with the description of data chaining described in column 49 and 51 of the above identified King et al. patent. Should the channel 401 signal to the control unit that a suspend operation is to be performed, a suspend latch is set at logic block 406 and zero status is set into the status generator 418. Status is sent and data are transferred from the registers 418 to the interface Bus In 430 by means of AND circuits 425, 423, 427 and 429 and appropriate gating from the selection logic and sequence of controls 405. A suspended operation is resumed when the channel transmits to the suspended control unit a zero command over the I/O interface. A zero command causes the command decoder and register 400 to wait for an output which energizes the resume suspended operation block 408. This block causes address in to drop at the interface and sets zero status into the status registers 418, in addition to resuming the suspended operation at the command execution controls 402.

Figure 2:
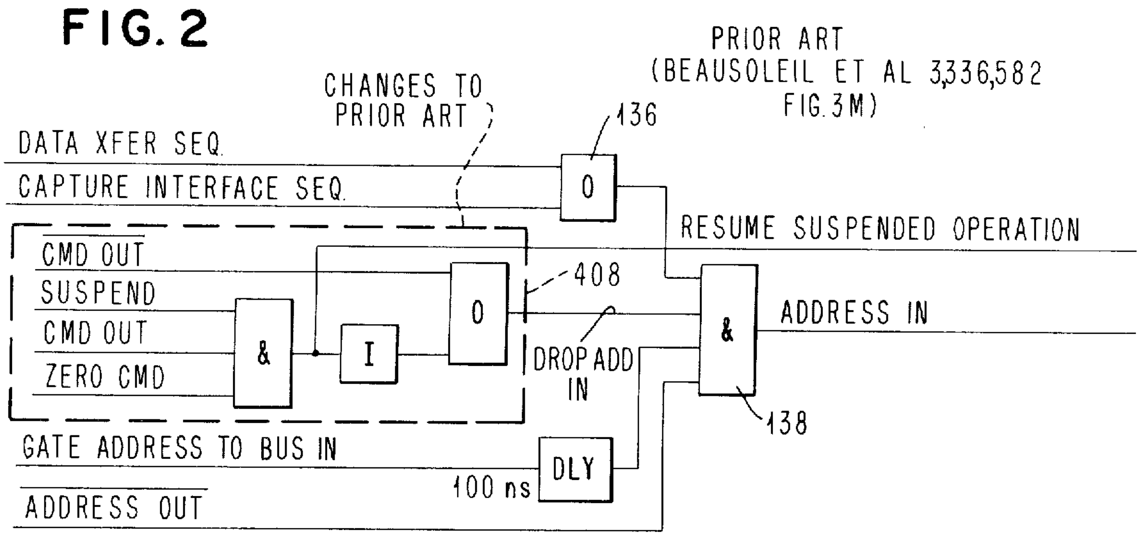
FIG. 2 is a detailed block diagram of the resume suspended operation block 408 of FIG. 1.
Figure 3:
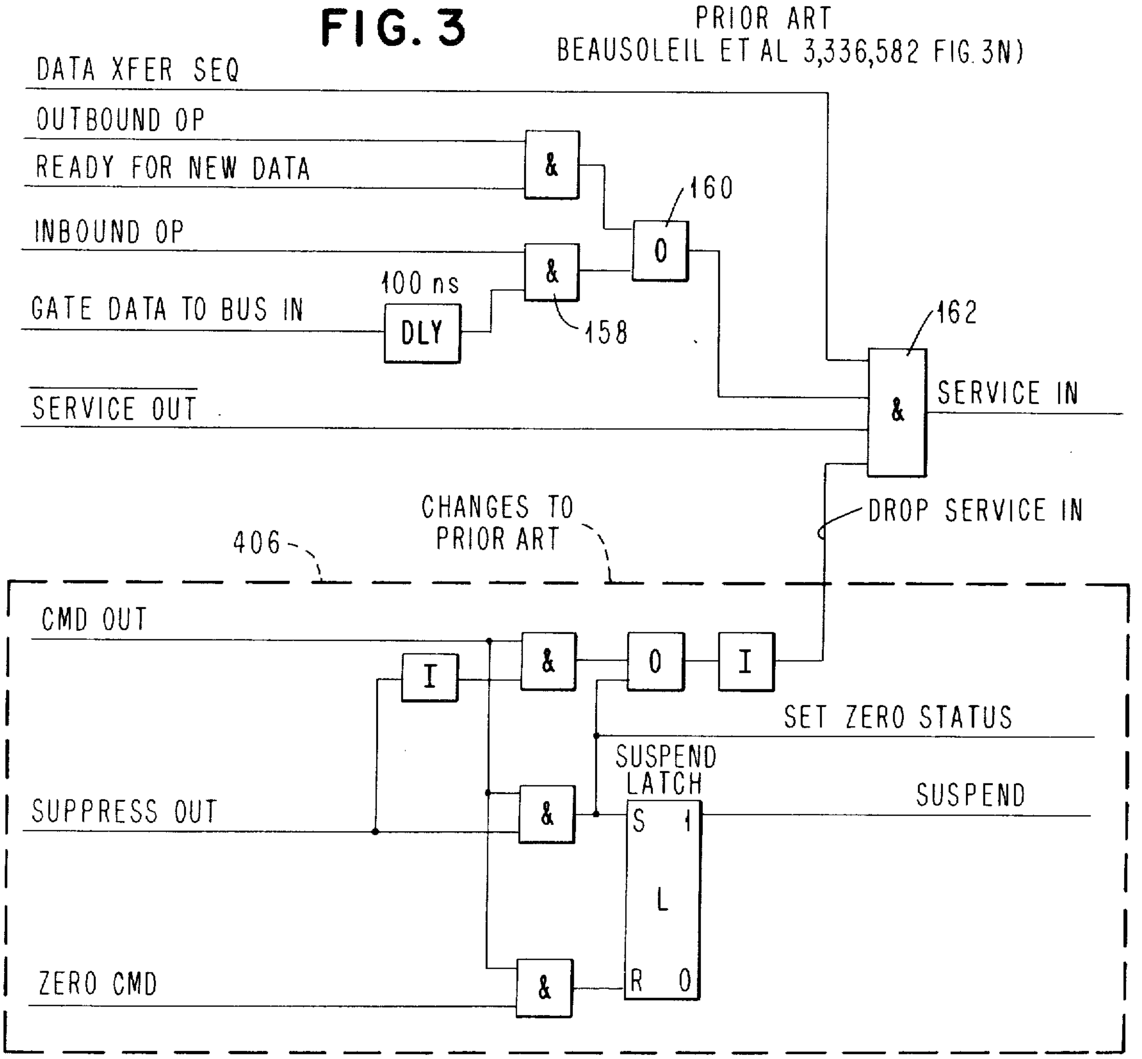
FIG. 3 is a detailed block schematic diagram of the suspend latch and control logic block 406 of FIG. 1.
Figure 4:
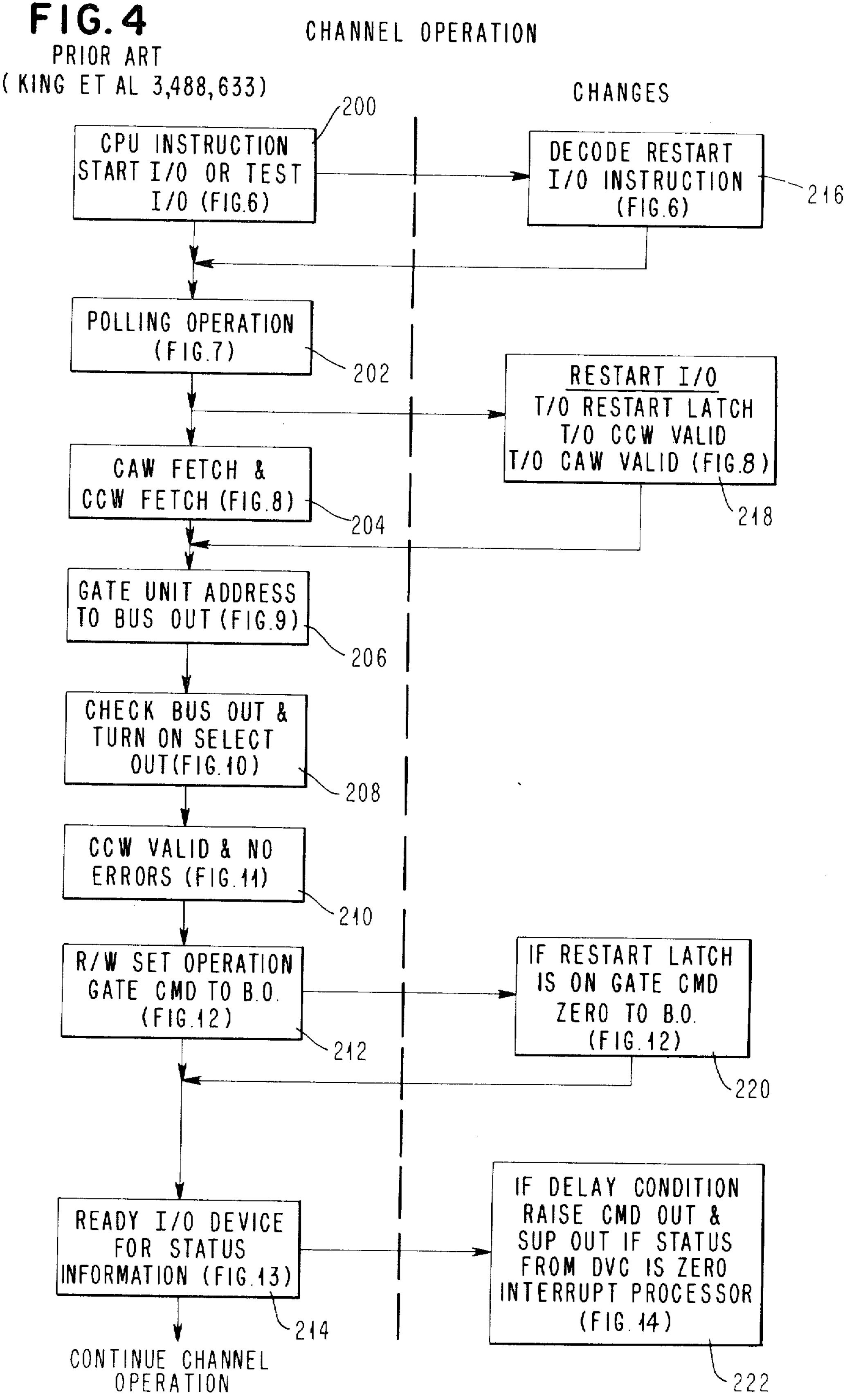
FIG. 4 PRIOR ART

The details of the suspend latch and controls 406 and the resume suspended operation 408 are shown in FIGS. 3 and 2, respectively. These circuits are described with respect to the logic flow diagrams of FIGS. 16 and 20. In FIGS. 3, 4, 16 and 20, the changes to the prior art Beausoleil et al. patent are shown by dotted lines.

Referring now to FIG. 4, with the above type of channel apparatus, an I/O operation is initiated when the central processing unit (CPU) executes an instruction specifying the type of operation, the channel address and the input/output control unit and device to be selected. The interface between the control unit and the channel then performs a polling operation 202 to select the I/O control unit addressed. At the next step 204 the channel enters main storage at a designated location and obtains a channel address word (CAW) which, in turn, provides the location in main storage of the first of a series of channel commands words (CCW's). Each CCW includes an operation code field, a data address pointing to a location address in main storage, and a count field which indicates the number of data units to be transferred, beginning at that location address.

After fetching the CAW the channel interface gates the unit address of the control unit to bus out, block 206. A check is made of bus out and the channel turns on the select out line at block 208 which causes a selection of the addressed control unit. A test is made at block 210 to insure that the CCW is valid and that no errors have occurred.

In a typical input/output operation, the first CCW of a chain of CCW's contains a command to read or write data at the device. At block 212 this command is transmitted to the control unit which controls the device and the control unit transmits data in response to this command. The final step in this operation at block 214 is to ready the I/O device for status information.

If a delay condition has occurred in the channel which requires a suspension of the I/O operation, the channel signals the control unit by raising a tag line called command out and a tag line called supress out to the device, block 222.

Figure 5:
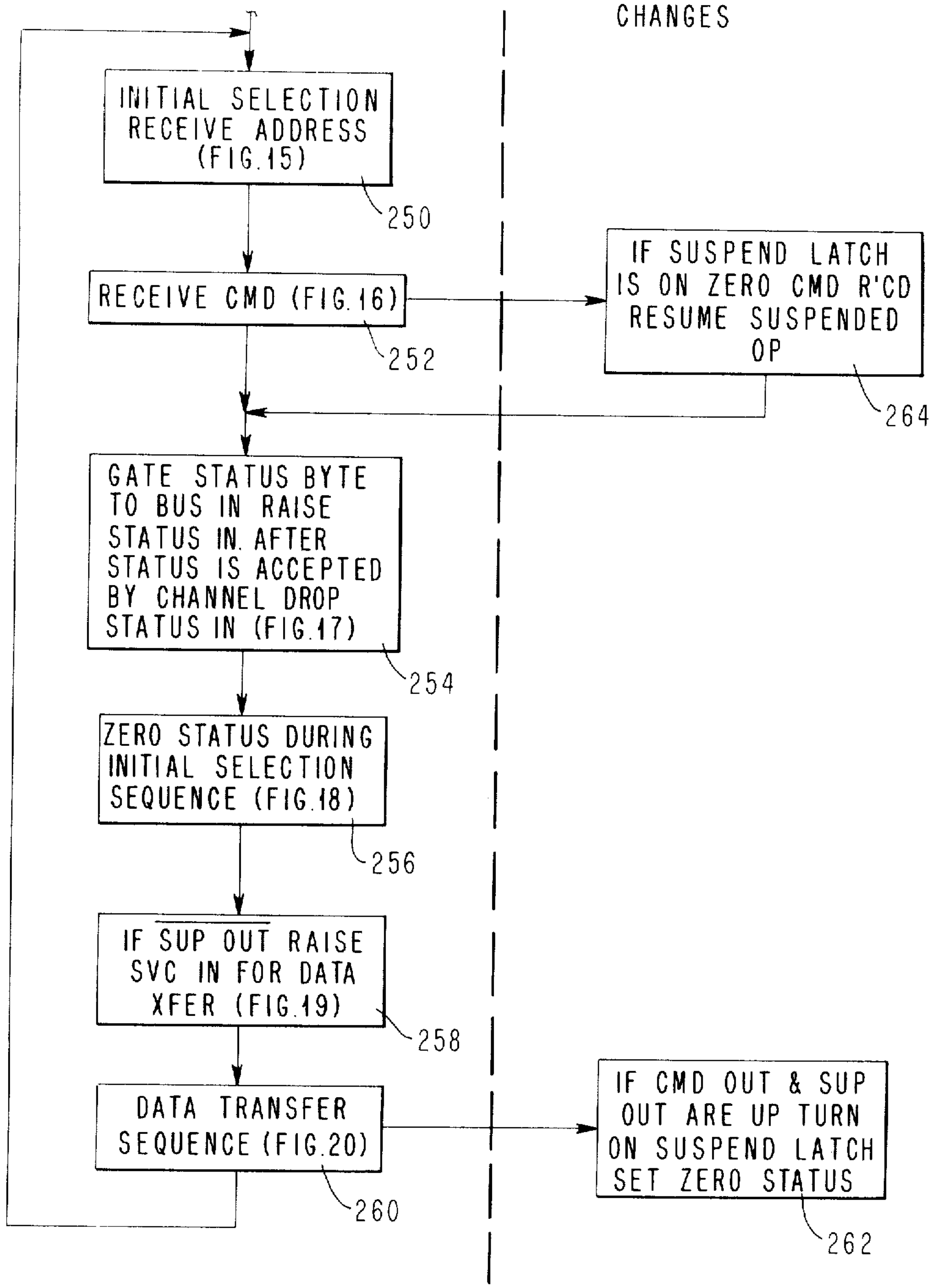
FIG. 5 is a flow diagram illustrating a control unit operation utilizing the present invention.

Referring now to FIG. 5, the corresponding control unit operation will be described. After an initial selection has occurred at block 250 and the control unit address has been received and checked, commands are received from the channel over the I/O interface at block 252. The commands are decoded and executed in accordance with the requirements of the particular I/O device being controlled. At block 254 the control unit gates a status byte to bus in and raises a tag line status in. After status has been accepted by the channel, the status in line is dropped. If no error conditions are encountered during this initial selection sequence, zero status is transferred to the channel at block 256.

At block 258 if supress out has been raised by the channel the control unit raises service in to obtain data transfer. A data transfer sequence takes place at block 260.

If, as shown in block 222 of FIG. 4, a delay condition has occurred in the channel, the channel raises command out and suppress out and interrupts the processor. In response to this, at FIG. 5, the control unit turns on the suspend latch and sets zero status in the status register as illustrated by block 262. At this point, the I/O operation has been suspended and the control unit can be disconnected by the channel.

After the delay condition has been removed, the CPU issues a restart instruction as illustrated by block 216 of FIG. 4. The channel then executes a polling operation 202 and at block 218 turns on a restart latch, and turns on CCW valid and CAW valid in order to reenter the channel program by setting up the conditions necessary at the channel for reentry. No CAW fetch is performed during this operation (block 204). The next step is to gate the unit address to bus out block 206, check bus out and turn on select out block 208. Since the CCW is valid and there are no errors, the channel proceeds. If the restart latch is on, block 212 is avoided and the channel gates a command of zero to bus out block 220.

Referring again to FIG. 5, the control unit responds to the above described operation and performs the initial selection sequence block 250 and receives the control unit address. The command of zero gated by block 220 of FIG. 4 is received by the control unit block 252. Since the suspend latch is on and a zero command is received, the control unit resumes the suspended operation at the point of suspension block 264.

DETAILED DESCRIPTION

INITIAL SELECTION — CHANNEL

Briefly, this operation selects the I/O device; obtains the CAW and CCW, receives device status, loads storage with channel and device status and returns condition code 00 or 01 to the processor.

Figure 6:
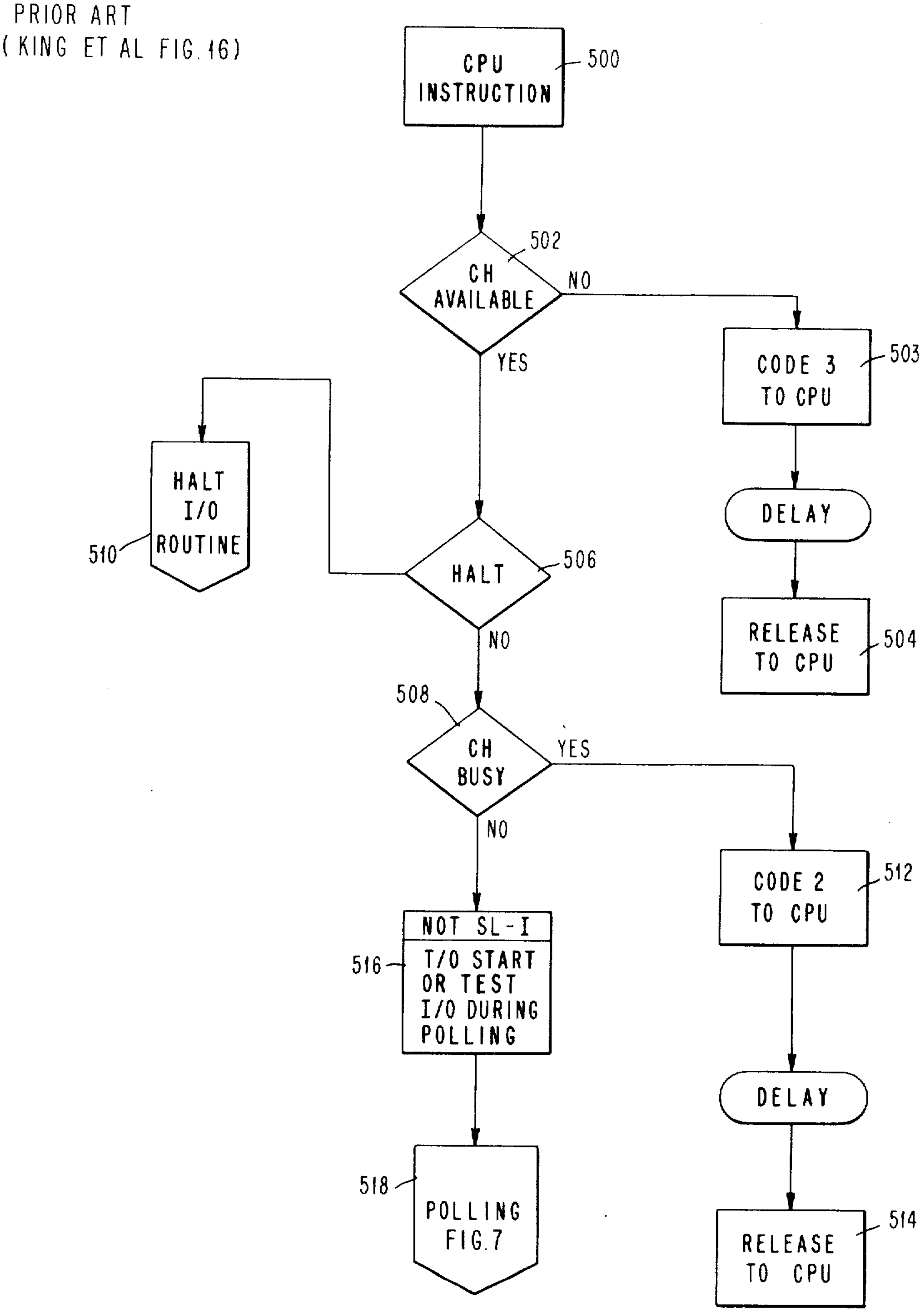
FIG. 6 PRIOR ART
FIGS. 6 – 14 are flowcharts describing in detail the operation of the I/O channel in which the invention is embodied.
Figure 7:
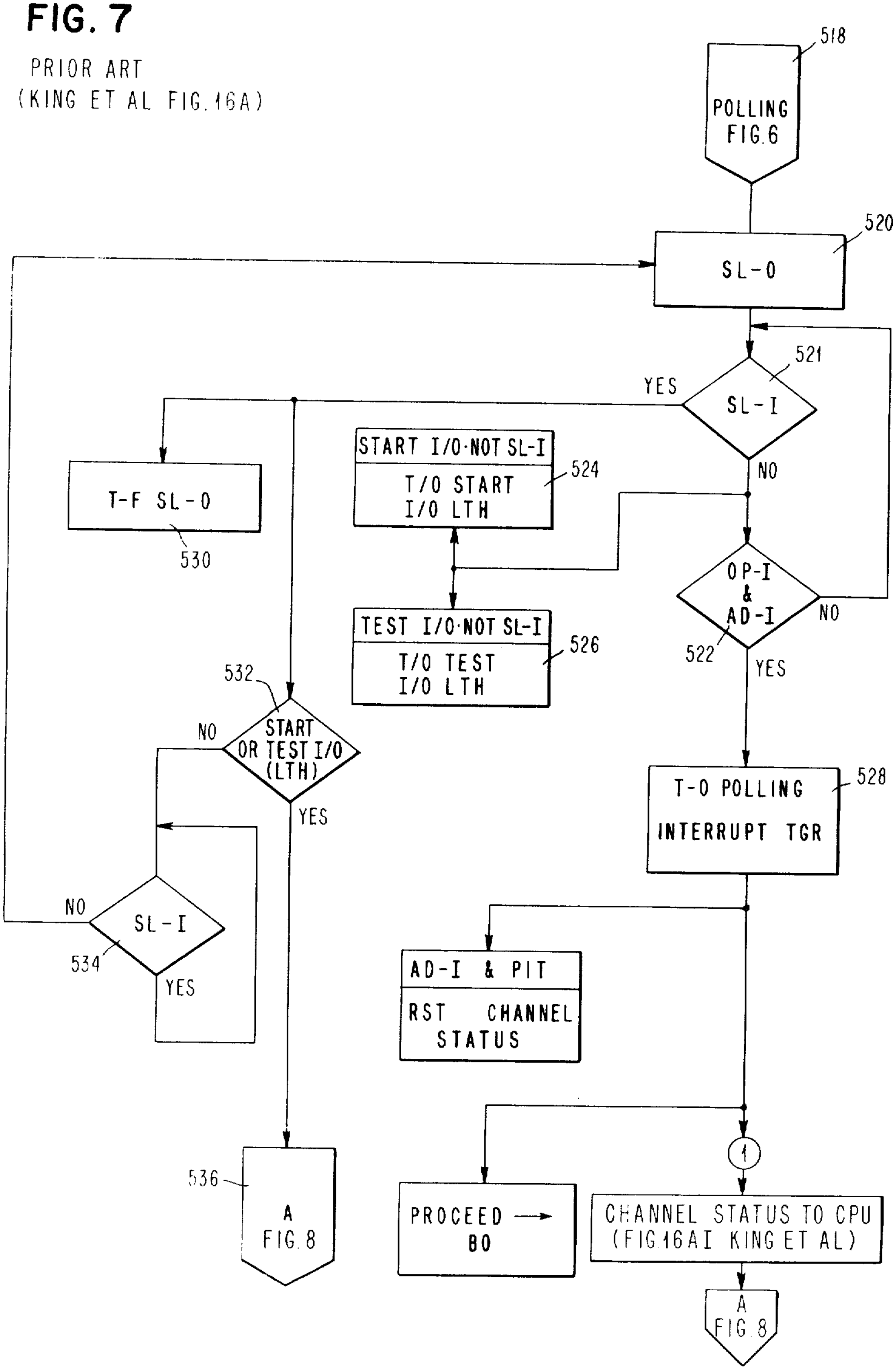
FIG. 7 PRIOR ART
Figure 8:
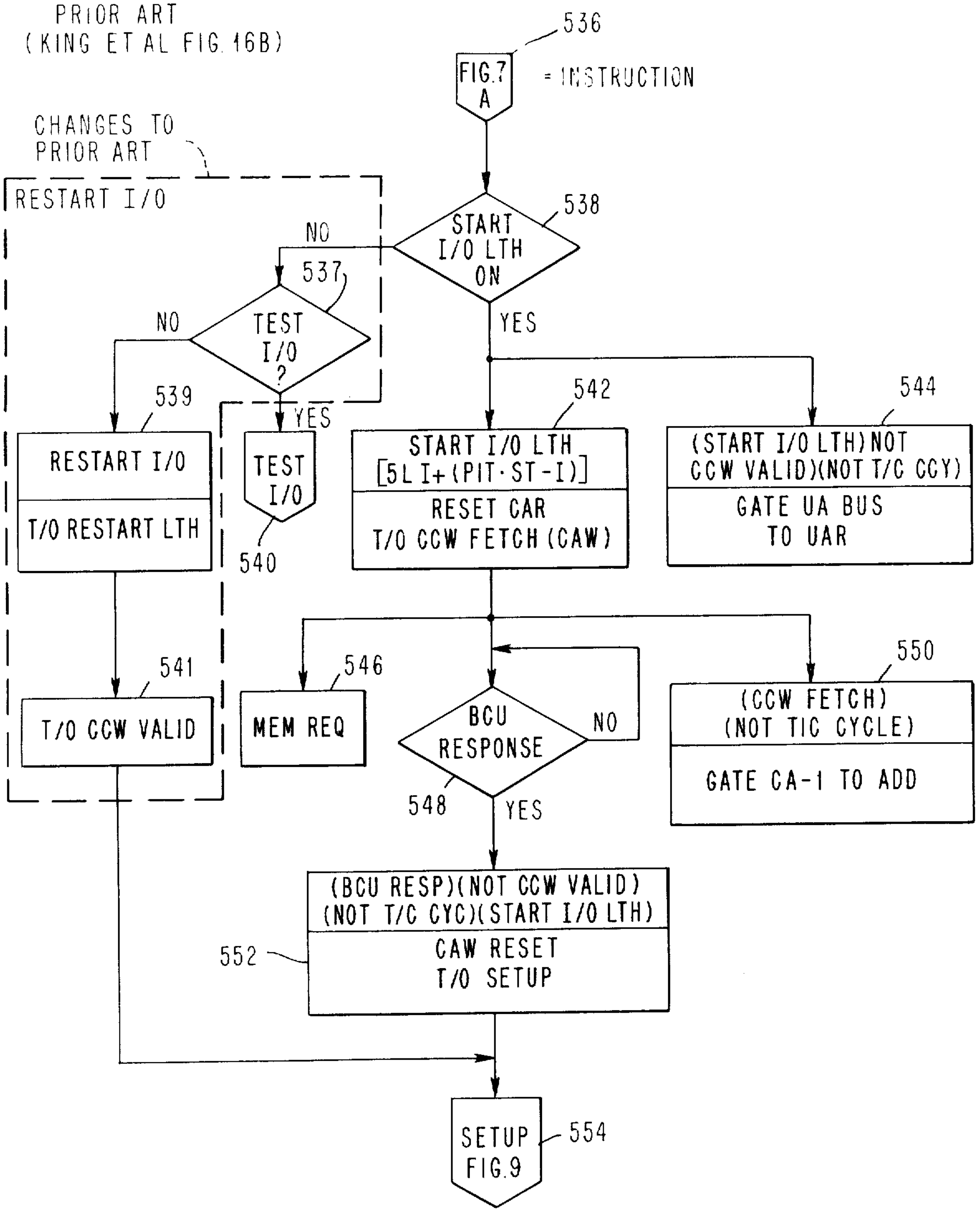
FIG.8 PRIOR ART

Referring to FIG. 6, with the channel available and not busy, the CPU instruction 500 initiates a start I/O or test I/O operation 516 while the I/O controls are conducting a polling operation 518. Referring to FIGS. 7 and 8, a polling operation 518 is described. The I/O control hardware performs a select out operation 520. This operation, as described in conjunction with FIGS. 11, 12 and 12A of the above identified King et al. patent, executes a select in decision 521. The select in line is a line returned in response to select out line after passage through the control units. If select in is present, none of the connected I/O devices require service. If select in is not present, a decision 522 determines if operational in and address in lines have been raised by the control unit. The channel proceeds to store the data and send channel status to the CPU. This operation begins by an operation 528 which turns on the interrupt trigger.

The absence of the unit address and address out lines causes the I/O device to return the select out pulse which appears as a select in pulse (block 521) to the tag in control hardware. The yes condition at 521 initiates a turn-off select out operation 530. Next, the channel executes a turn-on start I/O latch or turn-on test I/O latch operation 534, the start I/O latch being set as operation 516 in FIG. 6. The yes condition at 532 continues the initial selection. A no condition initiates a decision 534 to determine when select in has dropped. A no condition restarts the polling operation.

Turning to FIG. 8, the setup continues. The start or test I/O latches were set in operation 516 (FIG. 6). The CPU controls perform a start I/O latch decision 538. A no decision commences a test I/O routine 540 provided a test I/O is indicated at 537. A yes decision with respect to start I/O 538 initiates an operation 542 to turn on the CCW fetch trigger for a CAW fetch. Also, an operation 544 is executed to gate the unit address bus to the unit address register. This hardware is shown in FIGS. 13A and 13B of the King et al. patent. At this point, the channel commences to perform a memory request 546 for the CAW fetch which is followed by a CCW fetch. The setup operation continues after a BCU response decision 548 is acknowledged during the CAW fetch. This decision initiates a turn-on set operation 552 which is accompanied by a reset CAW.

Figure 9:
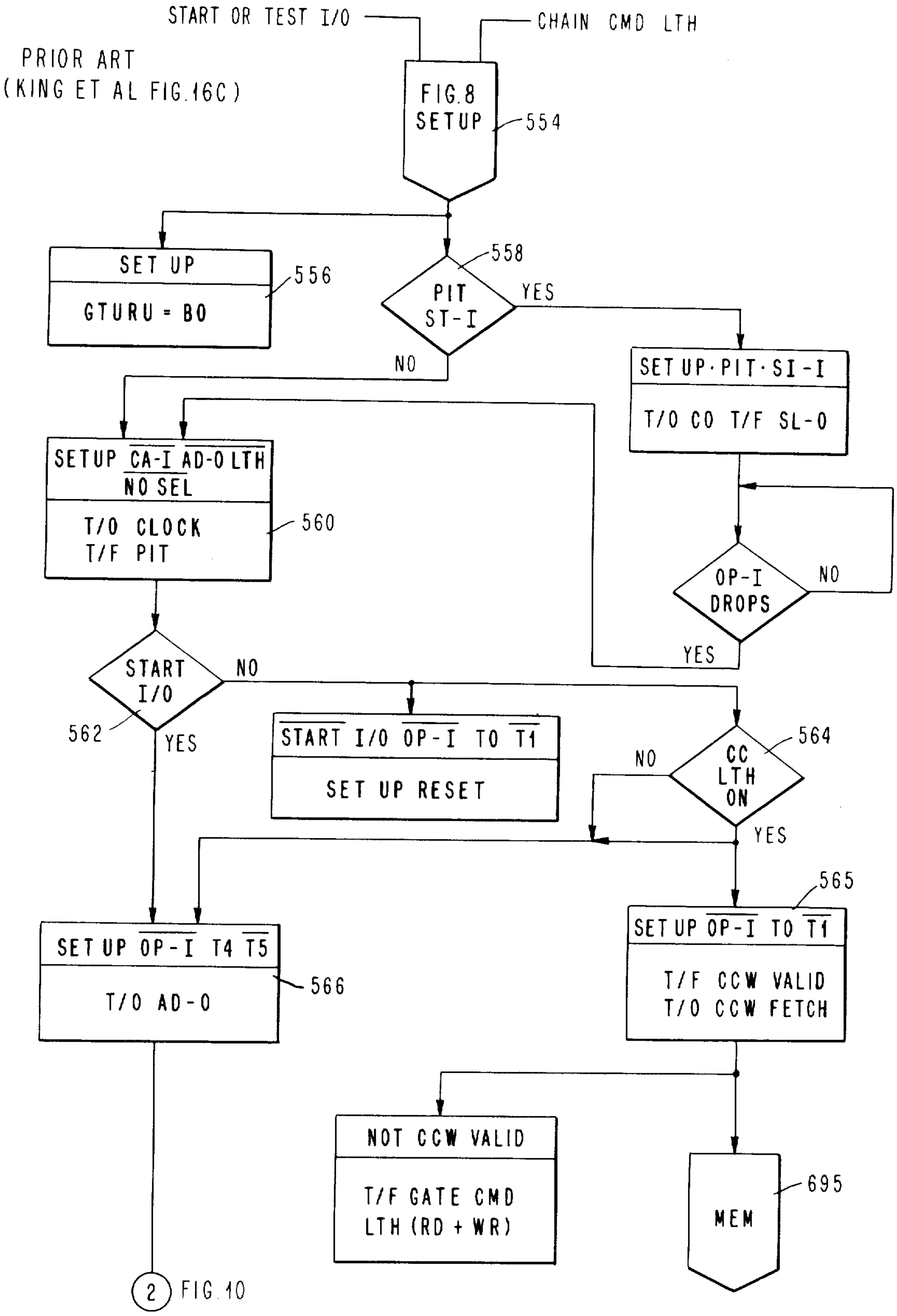

Turning to FIG. 9, the unit address register is gated to the bus out 556. The channel next tests for a polling interrupt trigger and status in decision 558. A yes condition is not executed since neither the status in or polling interrupt signal is present. The no condition continues the setup.

After the decision 558, the channel performs an operation 560 which turns on the clock and turns off the polling interrupt trigger. This operation is performed provided the signals indicated in the upper portion in the block are present. After this operation, the channel executes a start I/O decision 562. A no decision causes the channel to execute a command chain latch decision 564 which initiates a chaining operation. This operation is described more fully in the King et al. patent. In the absence of command chaining, the channel performs a turn-on address out operation 566, providing the signals indicated in the block are present. These signals are setup, not operational in, time 4, and not time 5.

Figure 10:
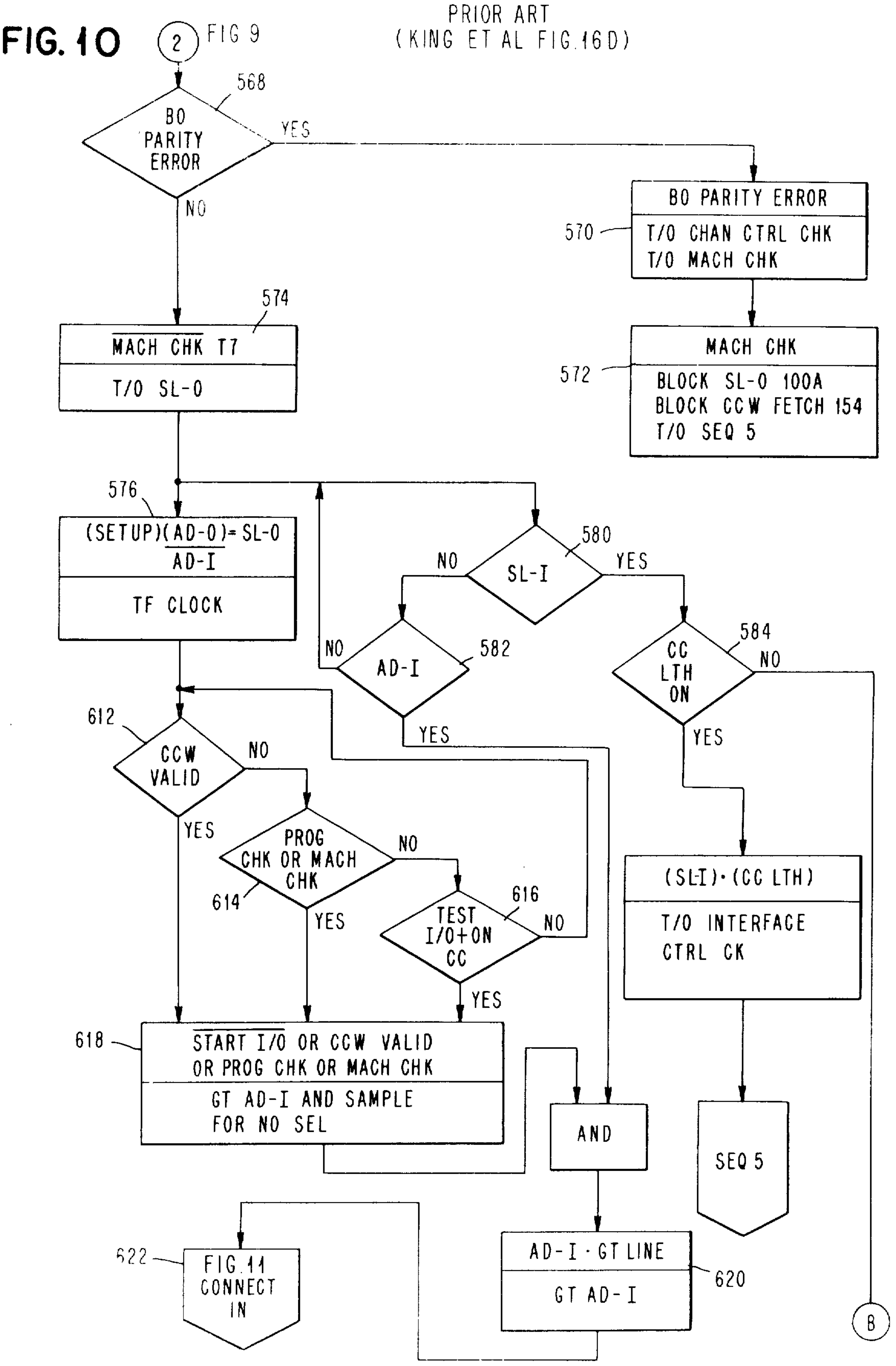

Continuing on FIG. 10, the bus out parity error decision 568 is performed. At this time, the bus out contains the unit address supplied in the instruction. A yes decision initiates a bus out parity error operation 570 and a machine check operation 572. The operation 572 also initiates a turn sequence 5 routine.

A no decision at 568 initiates a turn-on select out operation 574, the operation being performed at time 7 and in the absence of machine check signal. A turn-off clock operation 576 next occurs at the same time a select in decision 580 is being performed. With the address out line, select out, and unit address on the bus out, the select in decision is no, and further channel operation is held up until an address in decision 582 indicates yes.

Returning to the select in decision 580, a yes condition would require command chain latch decision 584 and the operations resulting from this decision are described in the King et al. patent with respect to chaining. At this point, the setup operation is held up because a CCW valid decision 612 cannot be performed. The CCW will be obtained after a CAW fetch and CCW fetch are executed.

The setup operation continues with a CCW valid decision 612 which is performed in conjunction with a program check or machine check decision 614 and a test I/O or command chain decision 616. The presence of any of these signals will initiate an I/O interface operation 618. The operation 618 gates the address in and samples for no select. The address in decision 582 and the I/O operations are ANDed together to control a gate address in operation 620. This operation controls connect in routine 622 which is described in conjunction with FIG. 11.

Figure 11:
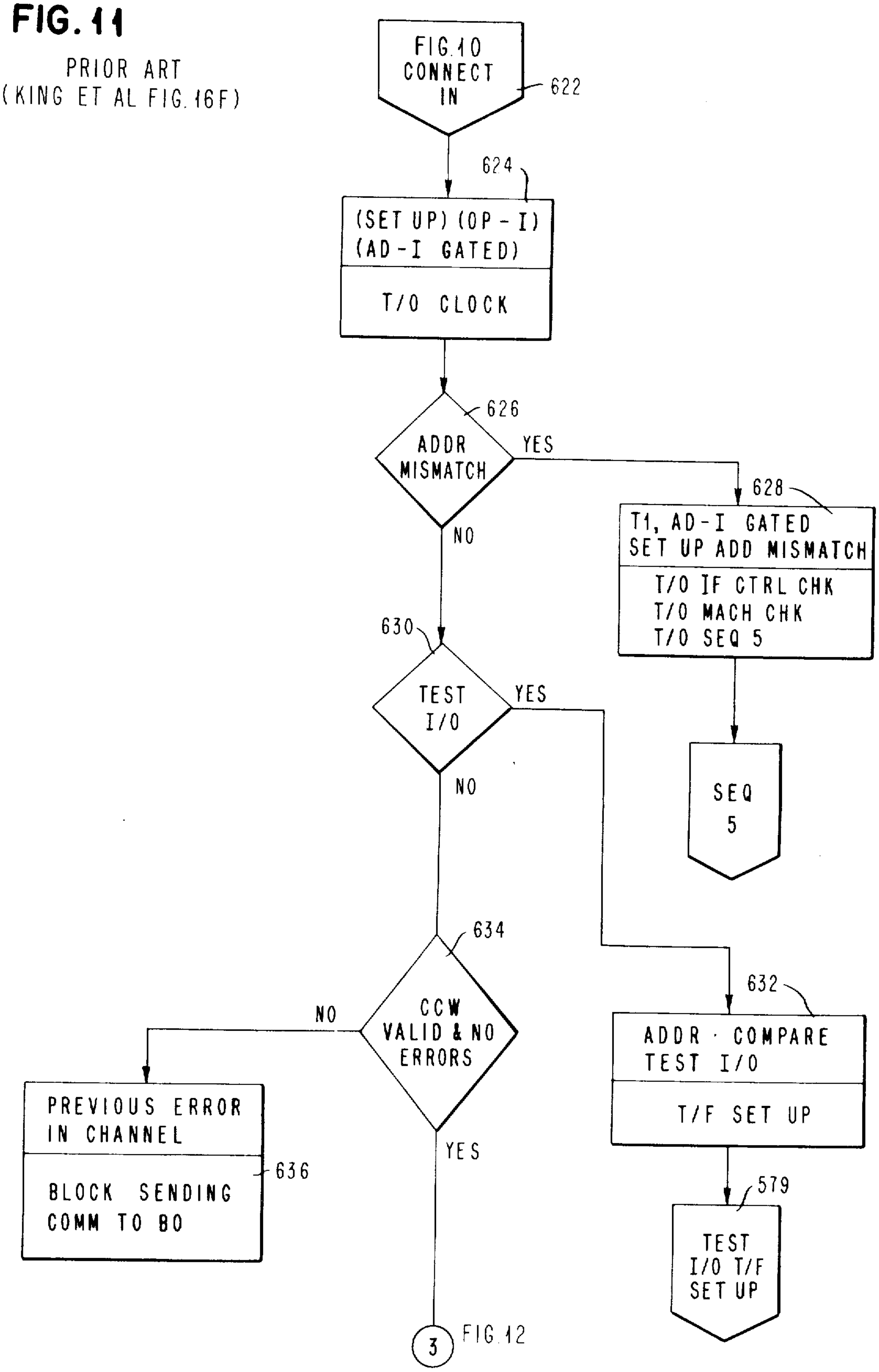
FIG. 11 PRIOR ART

Referring to FIG. 11, a turn-on clock operation 624 is the first event in the routine 622. This event takes place provided the signals indicated in the block 624 are present. An address mismatch decision 626 is next performed. The address in is checked against the address out in this decision. The yes condition initiates an ending operation 628 which will be described hereinafter. A no condition at 626 initiates a test I/O decision 630. The yes condition at 630 initiates a test I/O routine 632 which will be described herinafter. Since this is a start I/O routine, the no condition at 630 initiates :CW valid and no errors decision 634. A no condi-)n at 634 causes a command block operation 636 ovided a previous error exists in the channel. The :W valid trigger was set in a previous operation as scribed in the King et al. patent. Hence, the yes con-:ion causes a turn-off clock and setup operation 638, iich is shown in FIG. 12.

Figure 12:
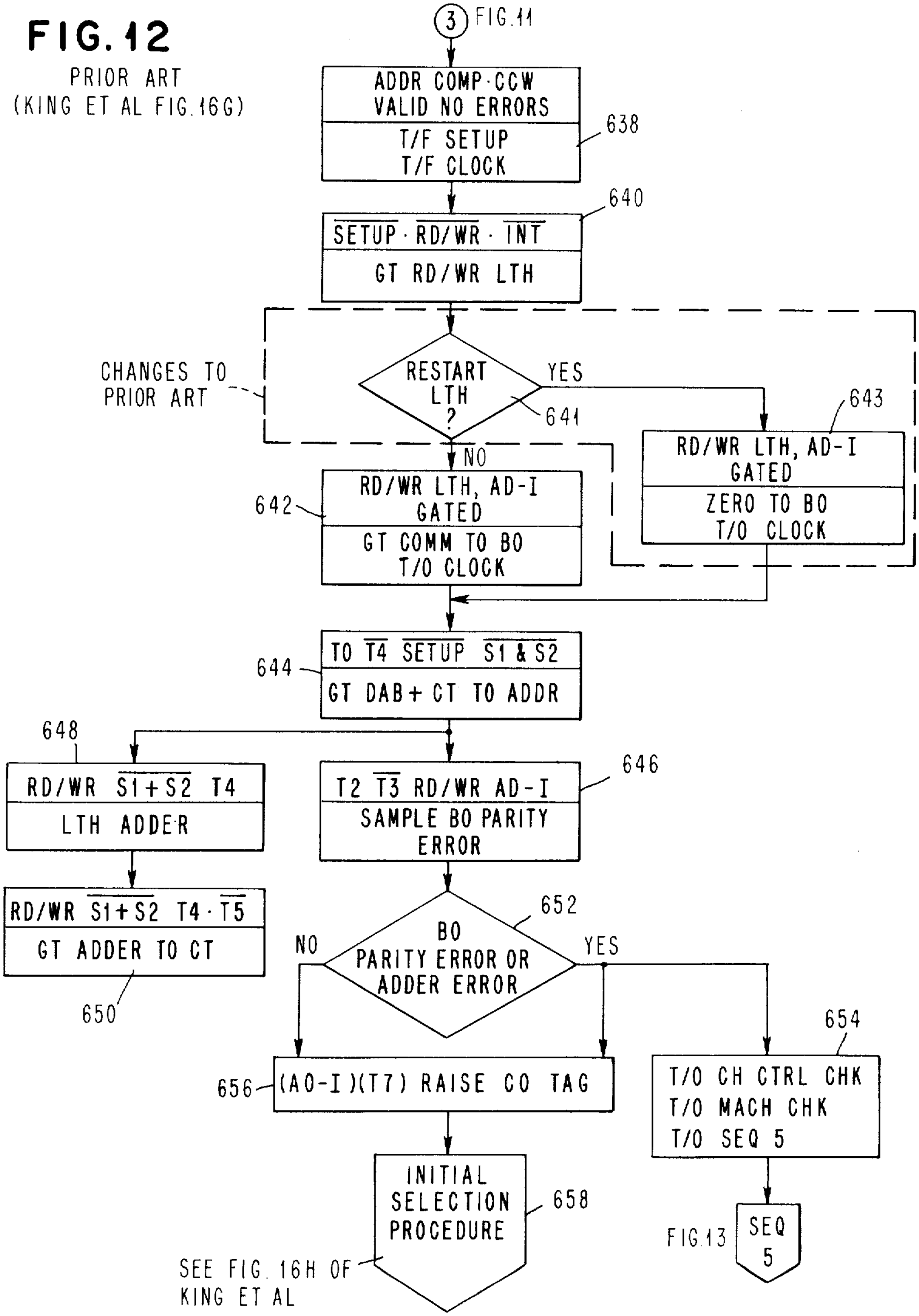
FIG. 12 PRIOR ART

Turning to FIG. 12, a read/write set operation 640 is xt performed. This operation selects a read or write eration depending upon the command. A test is ide at decision block 641 to see if the restart latch is . If no, an operation 642 gates the read or write com-ind to the bus out. If yes, a zero command is gated bus out. Assume the restart latch is off. At time T0 d not T4, a gating operation 644 is performed to gate e data address and count to the adder 214 (shown in G. 13A of the King et al. patent). At time T2 and not I, a bus out parity inspection 646 is performed. At ne T4, a latch adder operation 648 is performed, and is is followed at time T4 and not T5 by an operation i0 to gate the adder to the count register 206 (FIG. i of King et al. patent). A bus out parity decision 652 next performed. A yes condition initiates an ending quence routine beginning with a turn-on operation i4 of the channel control check, machine check and quence 5 triggers. At time T7, an operation 656 ises a command out tag line. This operation also oc-rs for the no condition based on the decision 652. ie channel is now ready to complete the initial I/O se-ction procedure 658 (refer to King et al. patent).

:LECTION LOGIC AND SEQUENCE CONTROLS — CONTROL UNIT

Figures 4C, 15:
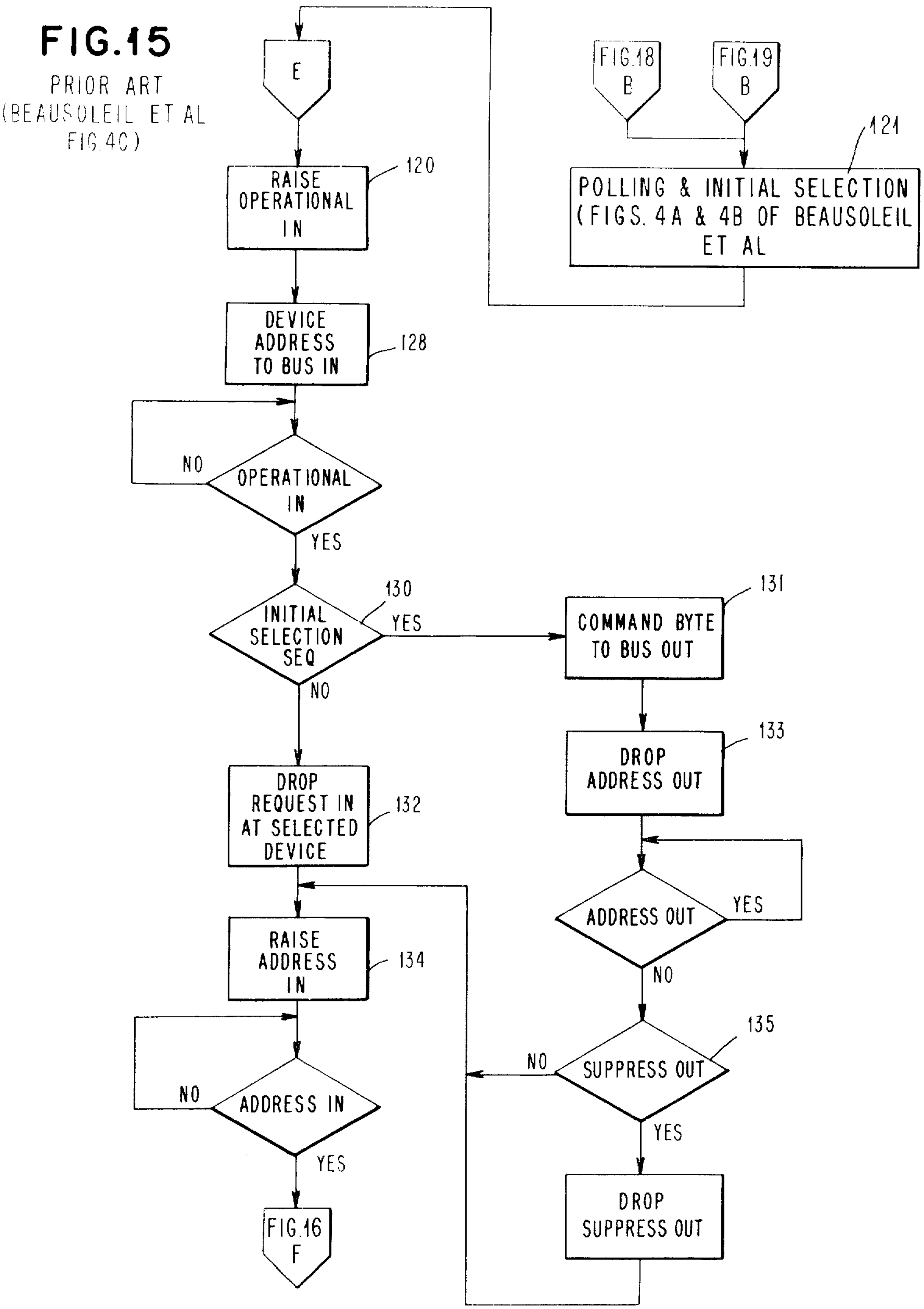
FIG. 15 PRIOR ART
FIGS. 15 – 20 are flowcharts describing in detail the operation of the control unit in which the invention is embodied.

The selection logic and sequence controls (405 of G. 1) briefly described here, are more fully described the above identified Beausoleil et al. patent. Refer-ıg to FIG. 15, after the polling and initial selection se-ıences represented by block 121 have been per-rmed, the control unit raises the operational in tag !0 and places the device address on bus in 128. If ere is an initial selection sequence, the command 'te is gated to bus out 131 by the channel and the iannel drops address out 133. If suppress out is up at !5 it is also dropped.

If it is not an initial selection sequence, block 130, en the operation was started by a request in from the ›ntrol unit and therefore, the flow includes block 132 drop request in. At 134 the control unit raises the ad-'ess in, and the flow continues on FIG. 16. At FIG. 16 it is a multiplex channel 139, then select out and hold ıt are droped 140. Since, in the embodiment shown this specification, a selector channel is attached, the › path is followed. The channel raises command out 14. When command out is sensed at the control unit, decision is made to see if the suspend latch is on at ock 141 in accordance with the present invention. nce at this point the suspend latch is not on, the no ıth is followed and the control unit drops address in block 150. This logic is shown in FIG. 2.

After address in has dropped, the channel drops com-and out 152 and the flow continues through block ;53 which makes a decision as to whether or not the quene is an initial selection sequence. If yes, the flow ›ntinues to FIG. 17.

Figure 17:
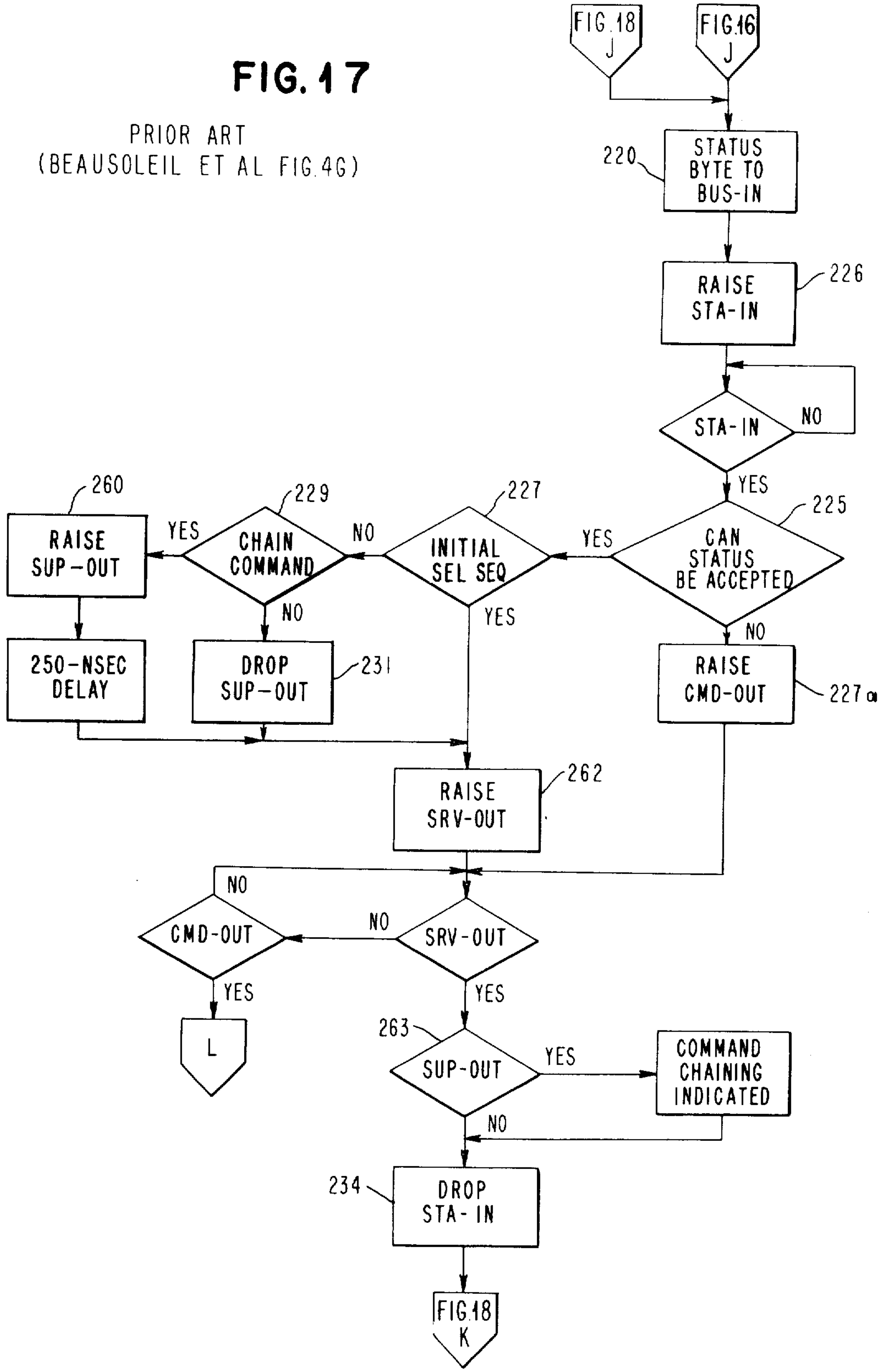
FIG. 17 PRIOR ART
Figure 18:
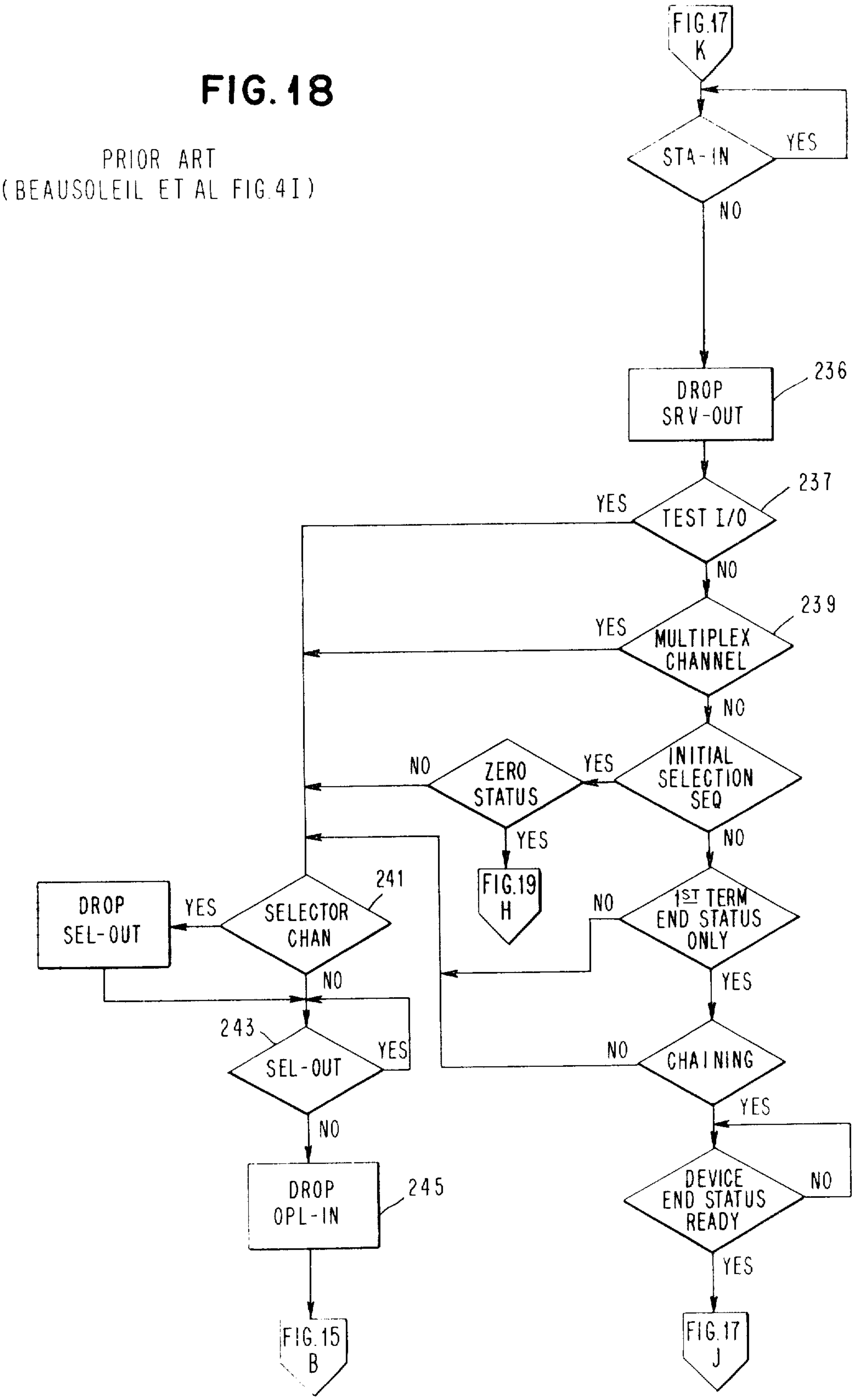
FIG. 18 PRIOR ART

At FIG. 17, the control unit gates the status byte to ıs in at block 220, and raises status in 226. If status ın be accepted at the control unit, the lefthand flow of block 225 is followed. If no, the channel raises command out 227A followed by raising service out and suppress out if command chaining is to be indicated. The control unit responds by dropping status in block 234 and the flow continues at FIG. 18. When status in has dropped, the channel drops service out 236 and since this is not a test I/O command or a multiplex channel, a decision is next made to indicate that this is an initial selection sequence. If zero status is returned, the flow contines on FIG. 19.

Figure 19:
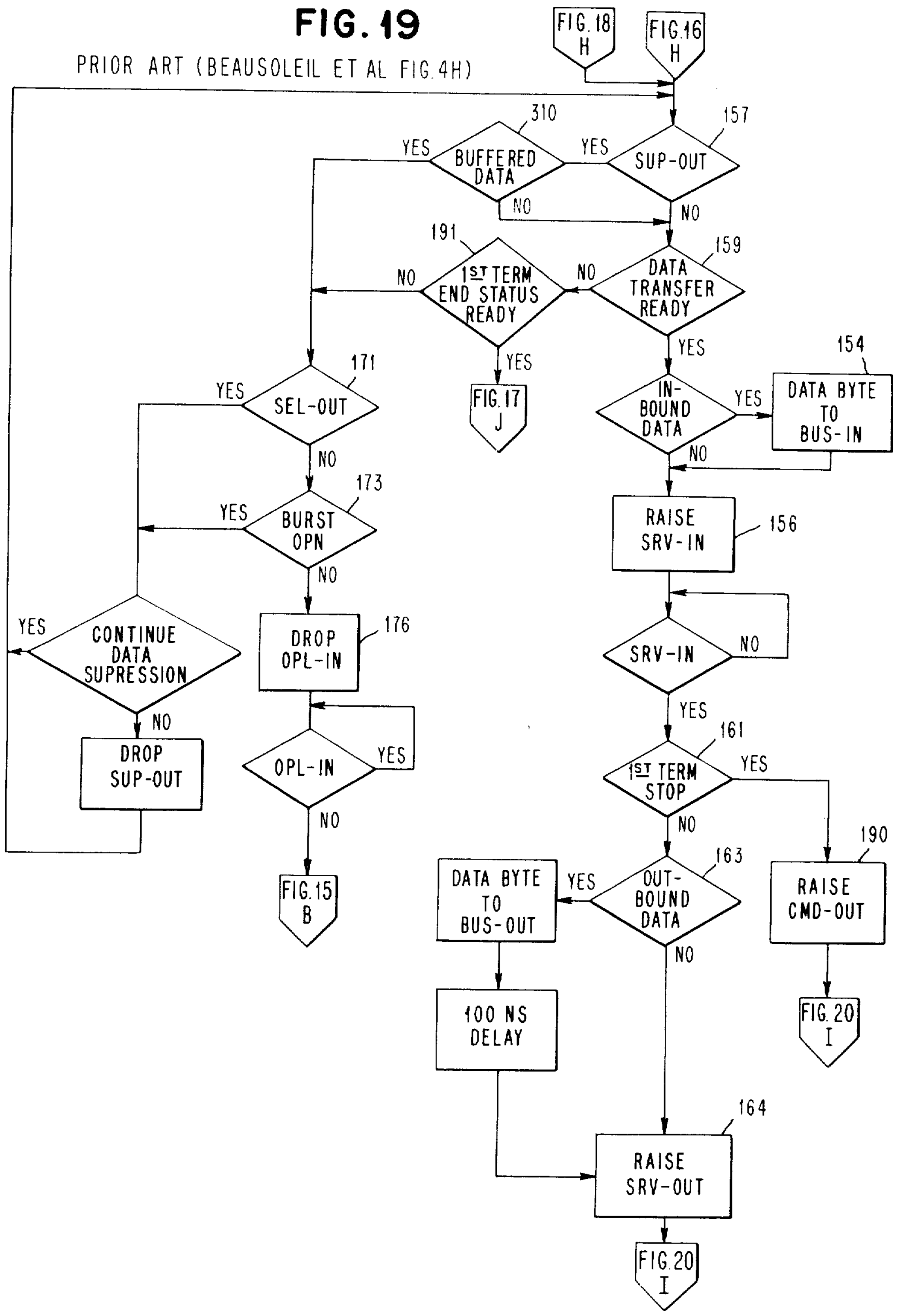

At FIG. 19, if suppress out is not up 157 and data transfer is ready 159 and data is to be transferred to the channel, a data byte is placed on bus in 154 and service in is raised 156. Assuming the channel does not want to stop 161, service out is raised 164 and the flow continues on FIG. 20.

Figure 20:
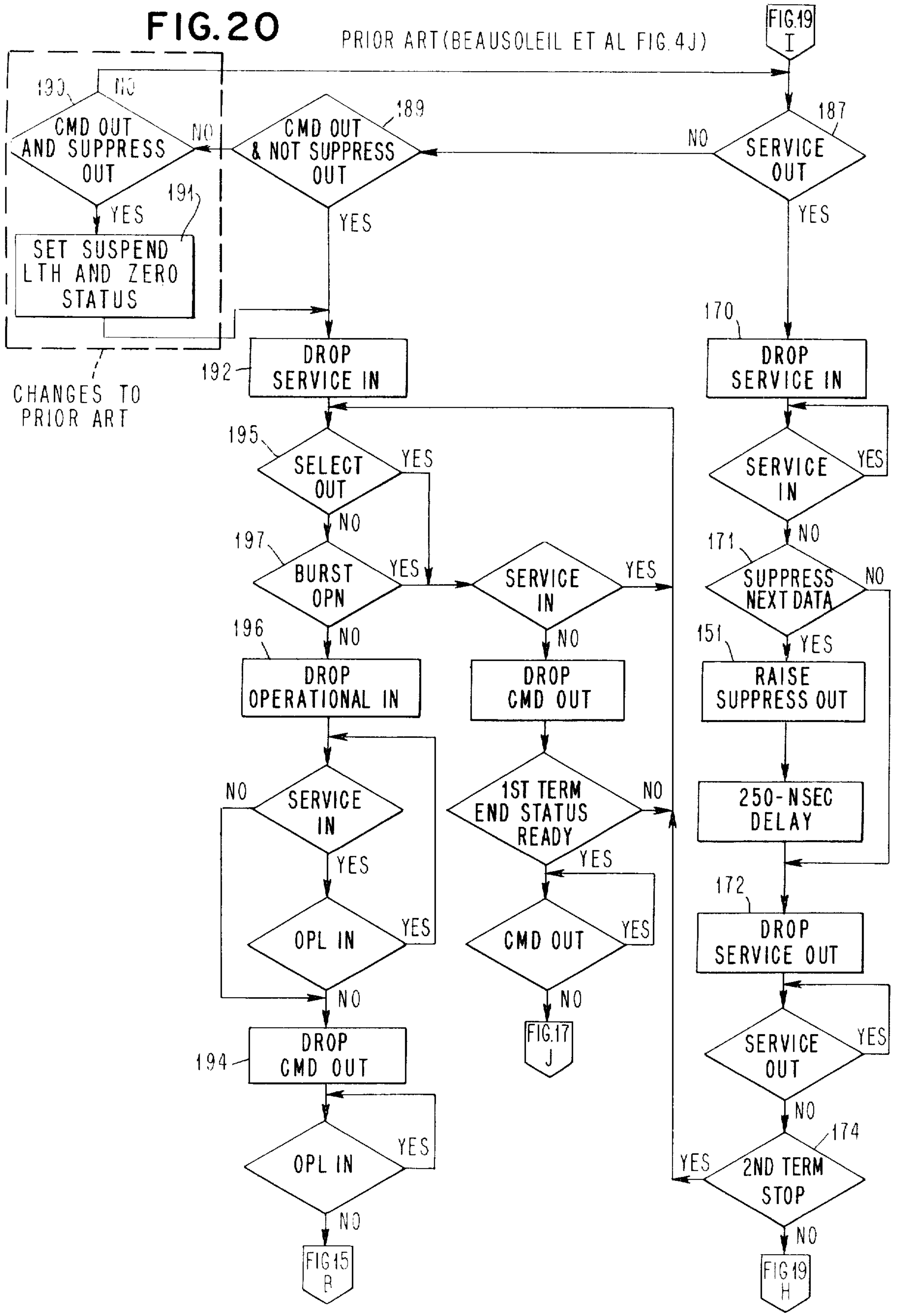

At FIG. 20, when service out drops, command out and not suppress out are present 189. The control unit drops service in 192. Since select out is down 195 and it is not burst operation 197, operational in is dropped 196 and command out is dropped 194 and the flow returns to FIG. 15.

If the channel wishes to suspend an operation, it does so by signalling with command out and suppress out raised block 190 at FIG. 20. This causes the control unit to turn on the suspend latch and to set zero status 191 as shown by the logic 406 of FIG. 3. The subsequent flow is the same previously described.

ENDING LOGIC — SEQUENCE 5 — CHANNEL

Figure 13:
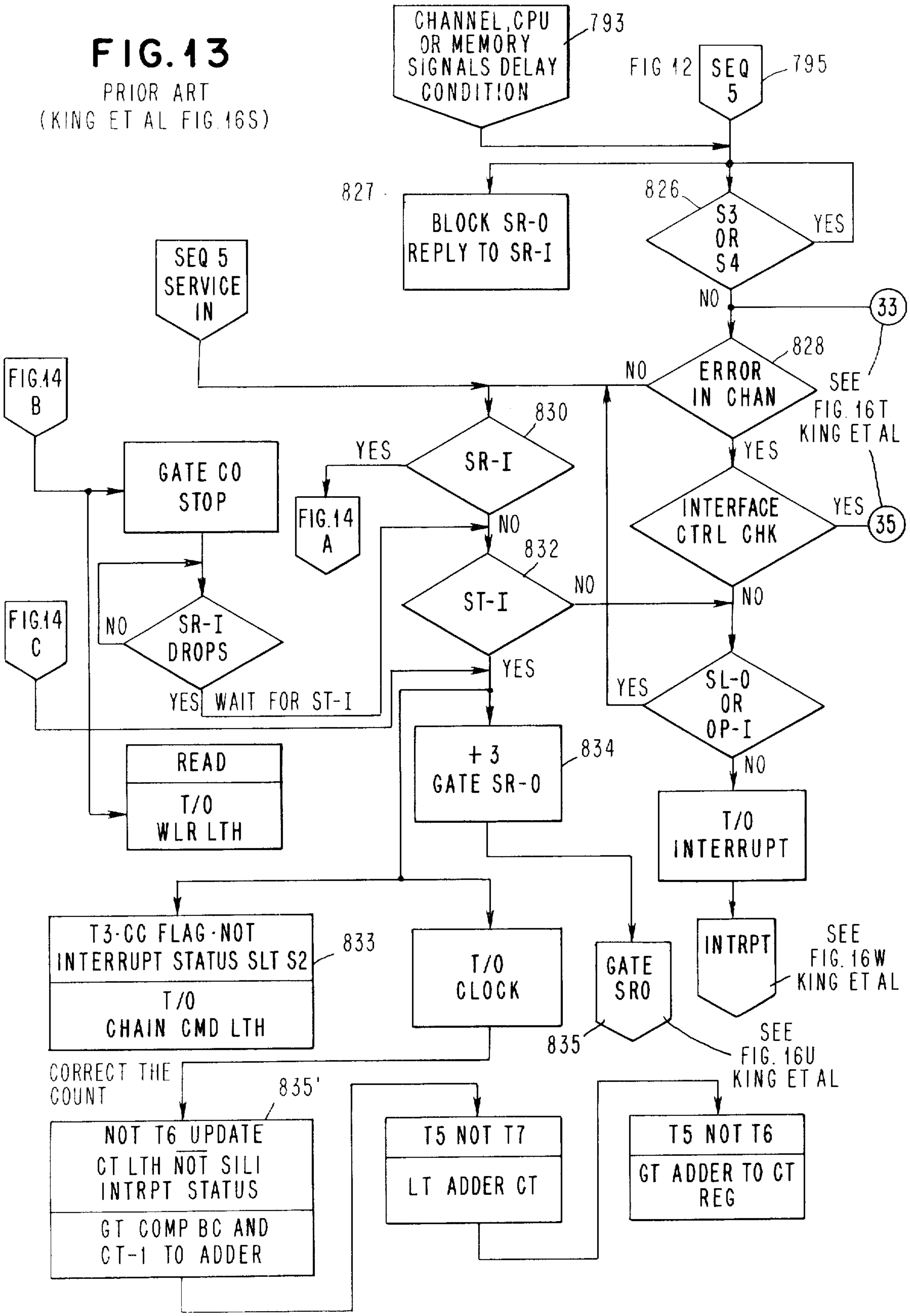
FIG. 13 PRIOR ART
Figure 14:
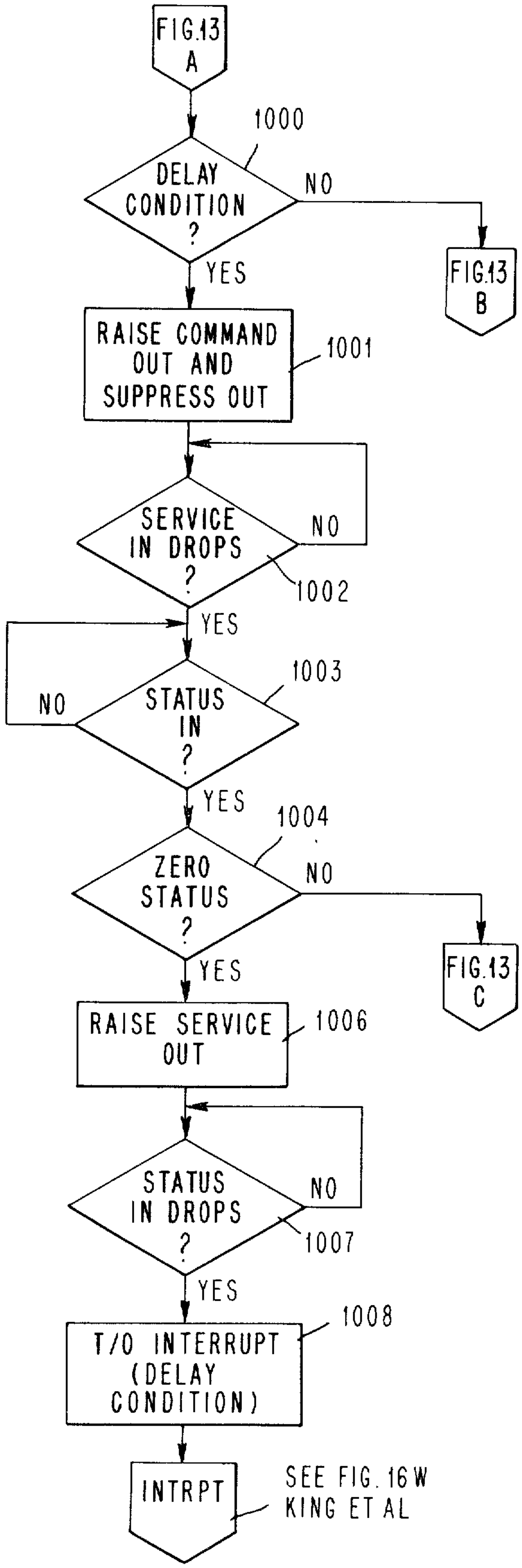

As more fully described in the above identified King et al. patent application, the channel logic sequences through sequence 5 to interrrupt the main program and store the status of the channel and the I/O device when the I/O operation is terminated or when a command is rejected during the execution of an instruction. This is shown in FIG. 13 which is a reproduction of FIG. 16S of King et al. with the addition of appropriate logic to suspend an operation as shown by FIG. 14. Normally, a sequence 5 is entered at the end of an operation or when an error occurs (see, for example, FIG. 12 block 654). The ending sequence begins with a sequence 3 or sequence 4 decision 826. These sequences were turned off in previous operations (see, for example, FIGS. 16L and 16N of King et al.). Service out is blocked and service in is replied to in block 827. Operations are performed in the channel to ready the I/O device for status information.

Assuming no error condition for decision block 828, a service in decision 830 is executed. Service in is down and next a status in decision 832 is made. Status in is up because there is a zero command on bus out as described with respect to operation 832 in FIG. 16T of King et al. A gate service out operation 834 is next performed. The gate service out routine 835 is shown in FIG. 16U of King et al. After the gate service out routine has been performed, the flow returns to FIG. 13 at the input labelled Sequence 5 Service In. Now at block 830 a yes output occurs because service in is up and the flow continues to FIG. 14.

SUSPEND OPERATION — CHANNEL

Referring to FIG. 13, a delay condition, block 793, at the CPU, channel or memory causes the channel to enter a sequence 5, ending sequence.

Referring to FIG. 14, decision block 1000 tests for the existence of a delay condition. If no, the flow of FIG. 13 is unmodified. If yes, the channel, as modified in accordance with the present invention, raises command out and suppress out, block 1001, at the I/O interface between the channel and the control unit. The control unit responds by dropping service in block 1002 and raises status in block 1003. If status information is to be tranferred, the no path is taken at block 1004 and the flow resumes on FIG. 13 at point C to process the appropriate status information.

If zero status is to be returned then the yes path of block 1004 is followed and the channel raises service out block 1006. In response to service out, status in drops 1007 and the channel interrupts the processor to indicate a delay condition at block 1008. The interrupt mechanism is described in FIG. 16W of King et al.

SUSPEND OPERATION — CONTROL UNIT

As described above with respect to FIG. 14, the channel raises command out and suppress out to signal the control unit that a delay condition exists. On the control unit side of the I/O interface the existence of command out and suppress out causes a yes output from block 190 of FIG. 20. The control unit turns on the suspend latch and sets zero status into the status register as shown by block 191.

Referring to FIG. 3, the above-identified Beausoleil et al. patent is modified to include the logic 406 which is comprised of a suspend latch and appropriate logic to turn on the suspend latch when command out and suppress out are raised at the I/O interface. This causes an output set zero status which sets zero status at the status generator 418 shown in FIG. 1.

When the channel recognizes the end of the data transmission before the I/O device attached to the control unit has reached its ending point, the channel responds with a command out line after the control unit has requested service by raising its service in line. This is shown on FIG. 19 where the channel indicates stop by means of decision 161 and raises command out at block 190. The flow continues on FIG. 20. The control unit tests for service out decision 187 and a command out decision 189. Since the channel is indicating a suspend operation, the output from 189 is no and the output from 190 testing for command out and suppress out is yes. In response thereto, the control unit sets the suspend latch and sets zero status in the status generator block 191. This is followed by operation 192 wherein the control unit drops the service in line. The channel responds to 192 with an operation 194 which drops the command out line. The I/O device does not proceed to its normal ending point but retains the previous command so that is can resume the suspended operation. Since the select out line from the channel is down and the interface is in a multiplex mode, the control unit executes decisions 195 and 197 which are no. The control unit then drops operational in 196 and the interface returns to the polling sequence shown on FIG. 15.

RESTART I/O — CHANNEL

With the suspend operation described above with respect to FIG. 14, the channel has interrupted the processor. The channel must be restarted by the appropriate instruction from the central processing unit.

Referring to FIG. 6, the central processing unit decodes a restart I/O instruction 500. This operation continues as for a start I/O instruction to FIG. 7 for a polling sequence. At block 520 select out is raised at the channel and the control unit responds with operational in and address in block 522. The channel transmits status information to the CPU as described in FIG. 16A1 of King et al. and the flow proceeds to FIG. 8.

Referring to FIG. 8, the start I/O latch is not on, decision 538, and the test I/O latch is not on, decision 537. The restart I/O latch is turned on, block 539 and CCW valid is turned on, block 541. The CAW fetch and the CCW fetch are thus bypassed and the set-up continues on FIG. 9. On FIG. 9, the unit address is gated to bus out. The flow continues on FIG. 10 where bus out is checked and select out is turned on. The flow continues on FIG. 11. On FIG. 11, since the CCW valid latch was turned on in operation 541 of FIG. 8, the flow continues from block 634 of FIG. 11 to FIG. 12.

Referring to FIG. 12, at decision block 641 the restart latch is on; therefore, the operation described at 643 is performed. A zero command is gated to bus out and the set-up procedure continues by the channel raising the command out tag block 656. The initial selection procedure continues as described with respect to FIG. 16H of King et al. This description will continue from the control unit side of the I/O interface.

RESUME SUSPENDED OPERATION — CONTROL UNIT

Figure 16:
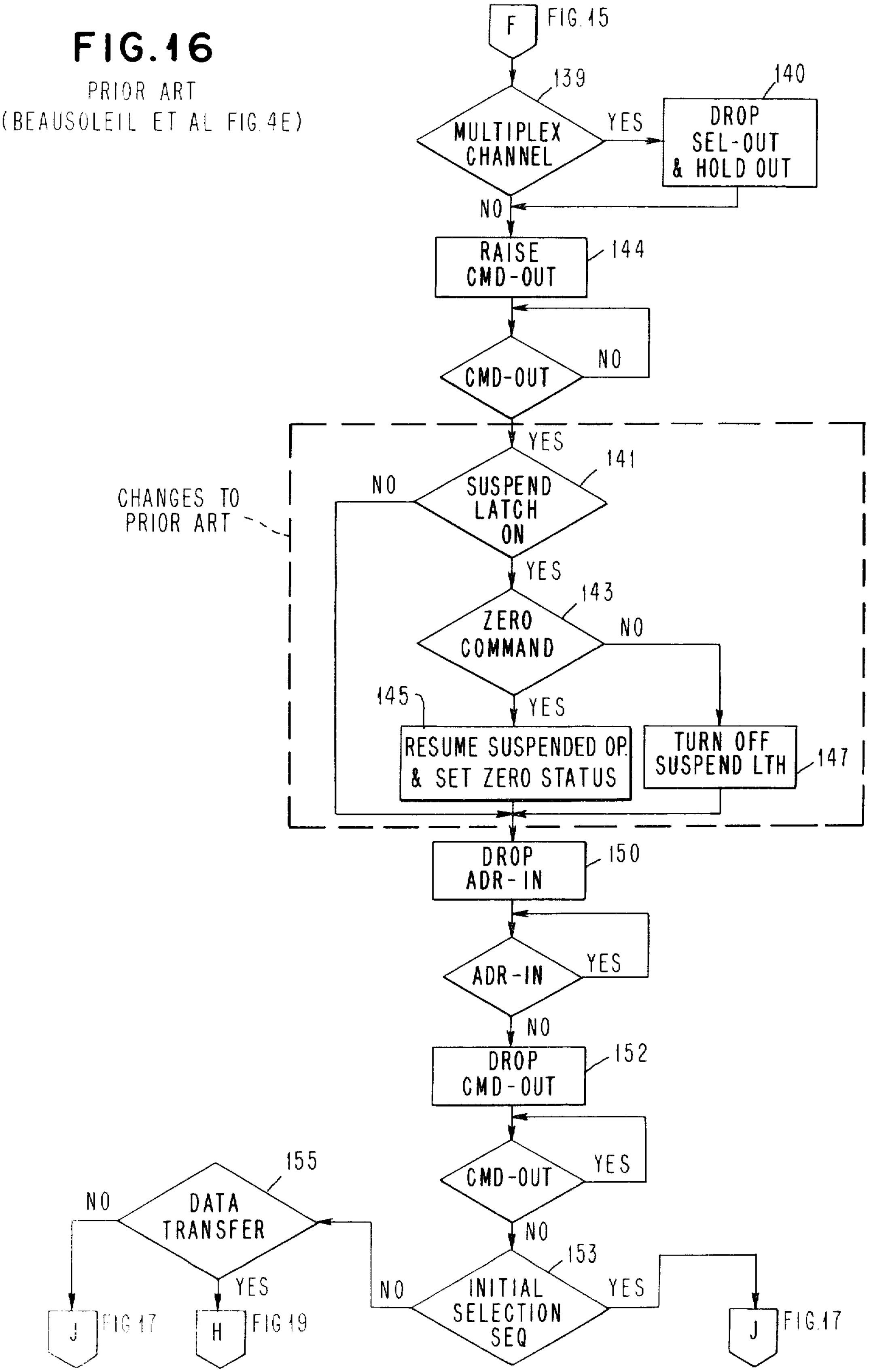
FIG. 16 PRIOR ART

Referring now to FIG. 16, the channel has raised command out block 144. In response to this the control unit tests to see if the suspend latch is on at decision block 141. Since this operation was previously suspended, the suspend latch is on and a yes output occurs. Since, as previously described, a zero command has been gated to bus out, the decision block 143 results in a yes output. Had a command other than zero command been sent to the control unit, the control unit would respond by turning off the suspend latch, block 147, thus cancelling the previous operation.

Since a zero command was gated, the control unit responds by resuming the suspended operation and setting zero status into the status register block 145. The initial selection procedure continues as previously described by the control unit dropping address in which the channel responds to by dropping command out block 152. The remainder of the operation is the same as a start I/O operation. The control unit has now resumed operation of a previously initiated channel program.

SUMMARY

What has been described is an input/output control mechanism in which a previously started I/O operation is suspended in the middle of a channel program upon the occurrence of some condition either in the CPU or in the channel requiring a delay before the operation can be continued. The control unit is held in a suspended state until the channel receives an instruction from the main program to restart the operation. Logic in the channel decodes a restart I/O instruction and sets itself in such as state that its hardware can resume the I/O operation. The channel does not fetch a new CCW but retains in its channel registers the last CCW fetched. The control unit operation is automatically resumed when the channel, after an initial selection sequence, addresses the control unit and sends the control unit a zero command. Upon receipt of the zero command and in response to the previously retained suspend condition, the control unit resumes the input/output operation at the point of suspension.

While the invention has been particularly shown and described with reference to the preferred embodiment thereof, it will be understood by those skilled in the art that foregoing and other changes in form and details may be made therein without departing from the spirit and scope of the invention.

What is claimed is:

1. In an input/output control mechanism including a channel and a control unit, said channel including means for executing a start I/O instruction to initiate a particular I/O operation the improvement comprising:

means at said control unit for registering a manifestation indicating that an I/O operation is suspended to thereby hold said control unit in a suspended state;

means in said channel for executing a restart instruction whereby said channel is set in such a state that said channel can resume the I/O operation;

means at said channel for sending a predetermined command to said control unit to resume said operation; and means at said control unit operative in response to said predetermined command and to said registering means for resuming said input/output operation at the point of suspension, whereby a previously started I/O operation may be suspended during the execution of a channel program upon the occurrence of some condition requiring a delay before the operation can be continued.

2. The combination according to claim 1 wherein said channel includes means for signalling said control unit that said I/O operation is to be suspended and wherein said registering means responds to said signalling means for placing said control unit in said suspended state.

3. In an input/output control mechanism, including a channel and a control unit, in which a previously started I/O operation started by executing a start I/O instruction within a main program is suspended during the execution of a channel program upon the occurrence of some condition requiring a delay before the operation can be continued, said channel including means for signalling said control unit that said operation is to be suspended, the improvement comprising:

means at said control unit responsive to said signalling means for registering a manifestation indicating that the I/O operation is suspended to thereby hold said control unit in a suspended state until said channel receives an instruction from the main program to restart the operation;

means in said channel for decoding a restart instruction and for setting said channel in such a state that said channel can resume the I/O operation;

means at said channel for selecting and addressing said control unit and for sending said control unit a predetermined command; and means at said control unit connected to said registering means operative upon receipt of said command and in response to said manifestation indicating the previously retained suspended condition for resuming said input/output operation at the point of suspension.

4. For use with a channel of the type in which an input/output operation is started by a first instruction, including means in said channel for signalling to indicate suspension of said operation and means in said channel for executing a second instruction for restarting said operation; a control unit comprising:

means responsive to commands received from said channel for executing said commands to control a device;

means responsive to the signalling means in said channel for registering a manifestation indicating that said operation is to be suspended;

means for resuming the execution of said command; and means responsive to said registering means and a command received from said channel during the execution of said second instruction for generating a signal for resuming said suspended operation.

5. For use with a channel of the type in which input/output operations are carreid out in response to a channel program comprised of a list of channel command words (CCW's) obtained by said channel from a storage, and in which address means in said channel specify the address of a CCW in said storage; said channel including means for executing a start I/O instruction to intitiate a particular I/O operation; further means in said channel for signalling to indicate suspension of said operation; and means in said channel for executing a restart instruction for restarting the suspended operation and for sending a predetermined command, a control unit comprising:

command execution control means responsive to commands received from said channel for executing said commands to control a device, said control means including means for suspending and resuming the execution of said commands;

means at said control unit responsive to the signalling means in said channel for registering a manifestation indicating that said operation is suspended; and means responsive to said registering means and said predetermined command received from said channel for resuming said suspended operation.

6. For use with controlling apparatus capable of executing a start I/O instruction for initiating an I/O operation in a peripheral device, a peripheral device controller comprising in combination:

suspend latch and control means;

selection logic means adapted to connect said controller to said controlling apparatus for receiving commands and control signals from said controlling apparatus;

command execution control means connected to said selection logic means responsive to commands from said controlling apparatus for effecting an I/O operation;

said suspended latch and control means responsive to said selection logic means for initiating suspension of said I/O operation in response to control signals from said controlling apparatus and resume suspended operation control means connected to said selection logic means, responsive to said selection logic means for initiating the resumption of a suspended I/O operation in response to a command from said controlling apparatus and signals received from said selection logic means.

7. For use with controlling apparatus capable of executing a start I/O instruction for initiating an I/O operation in a peripheral device, a peripheral device controller comprising in combination:

status generating means;

suspend latch and control means;

selection logic means adapted to connect said controller to said controlling apparatus for receiving commands and control signals from said controlling apparatus;

command execution control means connected to said selection logic means responsive to commands from said controlling apparatus for effecting an I/O operation;

means at said status generating means responsive to signals from said command execution control means and from said suspend latch and control means for indicating to said controlling apparatus the status of said peripheral device controller;

said suspend latch and control means responsive to said selection logic means for initiating suspension of said I/O operation in response to control signal from said controlling apparatus and for setting zero status in said status generating means;

resume suspended operation control means connected to said selection logic means, responsive to said selection logic means and a command from said controlling apparatus for initiative the resumption of a suspended operation in response to said command and signals received from said selection logic and sequence control means; and means connected to said status generating means and said selection logic means responsive to said selection logic means for supplying said status indicia to said controlling apparatus.

* * * * *